United States Patent
Shibahara et al.

(10) Patent No.: US 12,343,818 B2
(45) Date of Patent: Jul. 1, 2025

(54) METHOD AND APPARATUS FOR ANALYZING ADDITIVELY MANUFACTURED OBJECT, AND METHOD AND APPARATUS FOR ADDITIVELY MANUFACTURING AN OBJECT

(71) Applicant: University Public Corporation Osaka, Osaka (JP)

(72) Inventors: Masakazu Shibahara, Osaka (JP); Kazuki Ikushima, Osaka (JP); Atsushi Kawahara, Osaka (JP); Rino Takeuchi, Osaka (JP); Hikaru Hashizume, Osaka (JP)

(73) Assignee: University Public Corporation Osaka, Osaka (JP)

( * ) Notice: Subject to any disclaimer, the term of this patent is extended or adjusted under 35 U.S.C. 154(b) by 1386 days.

(21) Appl. No.: 16/643,258

(22) PCT Filed: Sep. 7, 2018

(86) PCT No.: PCT/JP2018/033185
§ 371 (c)(1),
(2) Date: Feb. 28, 2020

(87) PCT Pub. No.: WO2019/049981
PCT Pub. Date: Mar. 14, 2019

(65) Prior Publication Data
US 2020/0331102 A1  Oct. 22, 2020

(30) Foreign Application Priority Data
Sep. 8, 2017  (JP) .................................. 2017-173123

(51) Int. Cl.
B23K 31/00  (2006.01)
B23K 15/00  (2006.01)
(Continued)

(52) U.S. Cl.
CPC ........ B23K 31/003 (2013.01); B23K 15/0086 (2013.01); B23K 26/342 (2015.10);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS

2007/0023944 A1  2/2007  Mika et al.
2011/0213594 A1  9/2011  Zhang
(Continued)

FOREIGN PATENT DOCUMENTS

CN  101174148 A  5/2008
CN  101559511 A  10/2009
(Continued)

OTHER PUBLICATIONS

An improved prediction of residual stresses and distortion in additive manufacturing (Year: 2016).*
(Continued)

*Primary Examiner* — Jenny R Wu
(74) *Attorney, Agent, or Firm* — MARSHALL, GERSTEIN & BORUN LLP

(57) ABSTRACT

A displacement/stress computation unit computes residual stress and deformation by conducting a thermal-elastic-plastic analysis using idealized explicit FEM. A temperature increment is set in magnitude to have a value larger in magnitude than a temperature increment used in a thermal-elastic-plastic analysis using static implicit FEM. Heating is performed for each plurality of blocks according to a heating pattern in which blocks that are not adjacent to one another are simultaneously heated. Each block is heated with a surface heat source having a heat input quantity adjusted
(Continued)

with respect to a heat input quantity applied when a moving heat source is used to heat the block.

5 Claims, 13 Drawing Sheets

(51) Int. Cl.
  *B23K 26/342*   (2014.01)
  *B33Y 10/00*   (2015.01)
  *B33Y 30/00*   (2015.01)
  *B33Y 50/02*   (2015.01)
  *G06F 30/23*   (2020.01)
  *G06F 113/10*   (2020.01)
  *G06F 119/14*   (2020.01)

(52) U.S. Cl.
  CPC ............... *B33Y 10/00* (2014.12); *B33Y 30/00* (2014.12); *B33Y 50/02* (2014.12); *G06F 30/23* (2020.01); *G06F 2113/10* (2020.01); *G06F 2119/14* (2020.01)

(56) References Cited

U.S. PATENT DOCUMENTS

| | | | |
|---|---|---|---|
| 2013/0270232 | A1 | 10/2013 | Shimazawa et al. |
| 2015/0283762 | A1 | 10/2015 | Maeda et al. |
| 2015/0352794 | A1* | 12/2015 | Nguyen ................. B22F 10/25 700/98 |
| 2016/0235544 | A1 | 8/2016 | Linder-Ganz et al. |
| 2017/0037674 | A1 | 2/2017 | Hooper et al. |
| 2017/0072464 | A1 | 3/2017 | Takenami et al. |

FOREIGN PATENT DOCUMENTS

| | | |
|---|---|---|
| CN | 102152016 A | 8/2011 |
| CN | 102608918 A | 7/2012 |
| CN | 103440874 A | 12/2013 |
| CN | 103978690 A | 8/2014 |
| CN | 104972119 A | 10/2015 |
| CN | 105598448 A | 5/2016 |
| CN | 106061718 A | 10/2016 |
| CN | 106662439 A | 5/2017 |
| CN | 106694878 A | 5/2017 |
| JP | 2620353 B2 | 6/1997 |
| JP | 2007-30040 A | 2/2007 |
| JP | 2008-176535 A | 7/2008 |
| JP | 2012-122948 A | 6/2012 |
| JP | 2015-199197 A | 11/2015 |
| JP | 2017077671 A | 4/2017 |
| WO | WO-88/02677 A2 | 4/1988 |
| WO | WO-2015/133137 A1 | 9/2015 |
| WO | WO-2015/184495 A1 | 12/2015 |

OTHER PUBLICATIONS

Controlling of residual stress in additive manufacturing of Ti6Al4V by finite element modeling (Year: 2016).*
Residual Stress and Deformation Modelling for Metal Additive Manufacturing Processes (Year: 2015).*
Additive manufacturing Technologies by Gibson (Year: 2015).*
Finite element modeling and validation of thermomechanical behavior of Ti-6Al-4V in directed energy deposition additive manufacturing Qingcheng Yang, Pu Zhang, Lin Cheng, Zheng Min, Minking Chyu, Albert C. To (Year: 2016).*
Zhao, H. et al., "Research and application of welding heat source model with segmented movement," Proceedings of the Tenth National Welding Conference.
Office Action issued in Chinese Patent Application No. 201880058266.8 dated Jul. 1, 2021.
Notice of Grounds of Rejection issued in Japanese Patent Application No. 2019-541019 mailed May 17, 2022.
International Search Report issued in PCT Patent Application No. PCT/JP2018/033185 dated Nov. 20, 2018.
Notification of Decision to Grant Patent Right issued in Chinese Patent Application No. 201880058266.8 dated Jan. 6, 2022.

* cited by examiner

σ_x

σ_y

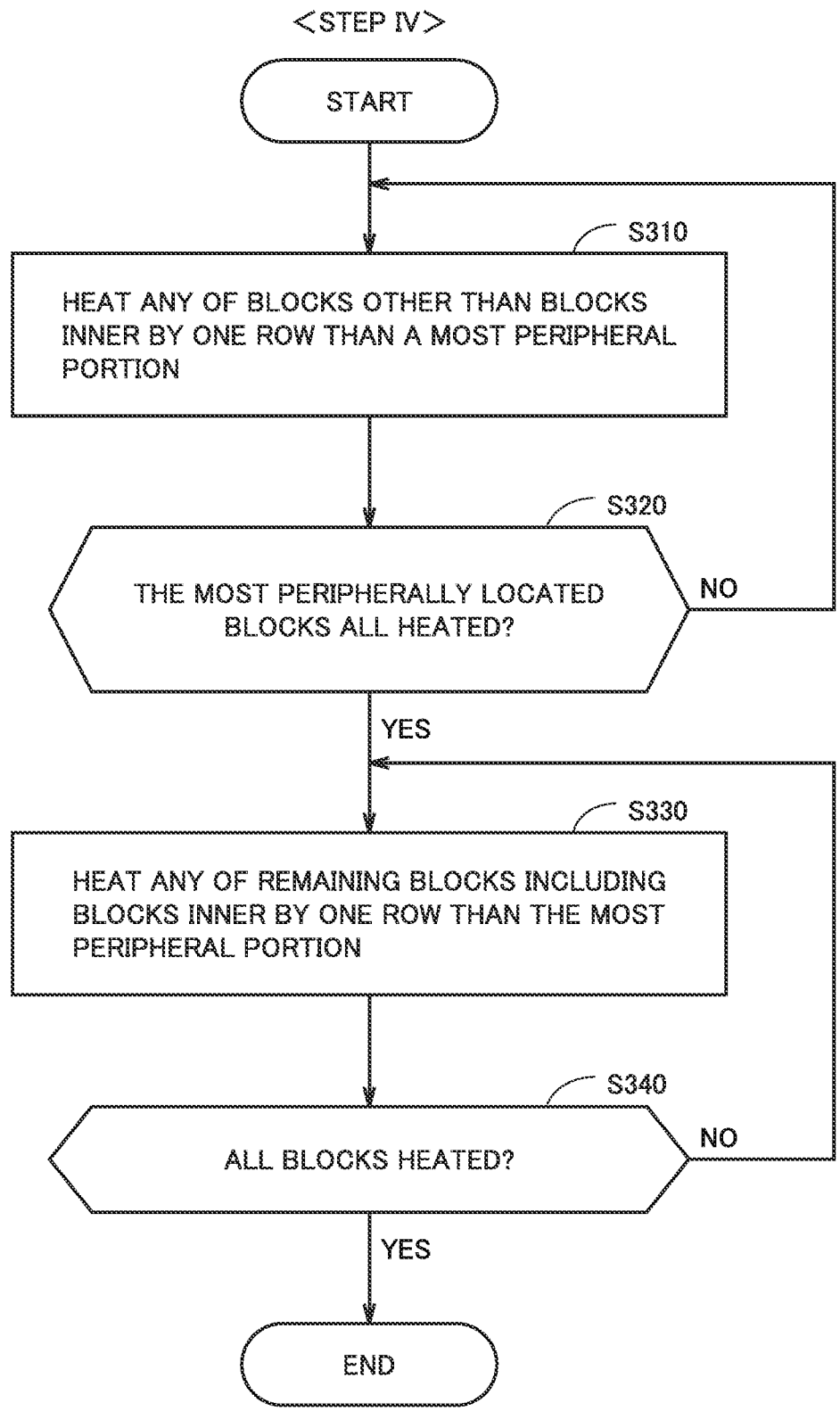

METHOD AND APPARATUS FOR ANALYZING ADDITIVELY MANUFACTURED OBJECT, AND METHOD AND APPARATUS FOR ADDITIVELY MANUFACTURING AN OBJECT

TECHNICAL FIELD

The present disclosure relates to a method and apparatus for analyzing an additively manufactured object and a method and apparatus for additively manufacturing an object.

BACKGROUND ART

In recent years, additively manufactured objects manufactured by depositing a molten material while solidifying it are attracting attention. For example, a so-called metal 3D printer is known that additively manufactures an object in a desired form by irradiating metal powder with a laser, an electron beam, or the like to melt the metal powder and solidifying it. Japanese Patent No. 2620353 discloses a method in which a metal or similar powder layer is irradiated at a prescribed portion thereof with a laser beam and thus sintered to form a sintered layer and such sintered layers are sequentially formed to manufacture a three-dimensional, additively manufactured object (see JP2620353).

In addition, additive manufacturing by using resin powder, additive manufacturing in which molten resin, metal melted by arc discharge, or the like is deposited, and the like are also known.

For example, in additive manufacturing by using a metal 3D printer, an object is manufactured while metal powder is irradiated with a laser, an electron beam or the like and thus melted, and solidified, and accordingly, significantly large residual stress and deformation can be caused in the obtained additively manufactured object. Such residual stress and deformation cause problems such as poor dimensional accuracy and cracking of the obtained additively manufactured object.

Therefore, before additively manufacturing an object, it may be necessary to previously examine residual stress and deformation that are caused in the object. However, with an examination by an experiment using an actual product, it is difficult to measure residual stress or may cause a problem in terms of cost.

Therefore, it is desired to make residual stress and deformation caused in an additively manufactured object analyzable in advance by a computer. If residual stress and deformation caused in an additively manufactured object can be analyzed and estimated by a computer, effects of various factors such as stress and deformation caused in the additively manufactured object can be easily examined, and how many times a product is prototyped can be reduced to contribute to cost reduction.

A thermal-elastic-plastic analysis using a finite element method (FEM) is useful for such an analysis of residual stress and deformation by a computer. Such a thermal-elastic-plastic analysis is generally conducted using static implicit FEM, which requires sequentially solving a stiffness equation (multidimensional simultaneous linear equations) of the entire system at each computation step, and in reality it is difficult in view of computing time to apply static implicit FEM to an analysis of additive manufacturing on a large scale.

Therefore, an object of the present disclosure is to significantly reduce a computing time in an analysis method and apparatus for analyzing, with a computer, residual stress and deformation caused in an additively manufactured object.

Another object of the present disclosure is to provide a method and apparatus for additively manufacturing an object, that can suppress residual stress and deformation caused in the additively manufactured object.

SUMMARY OF INVENTION

According to the present disclosure, a method for analyzing an additively manufactured object is a method for analyzing, with a computer, residual stress and deformation caused in an additively manufactured object manufactured by depositing a molten material while solidifying the material, comprising: inputting data for performing a thermal-elastic-plastic analysis of the additively manufactured object by employing a finite element method (FEM); and computing residual stress and deformation caused in the additively manufactured object, by performing the thermal-elastic-plastic analysis in accordance with time series data of a temperature distribution caused in the additively manufactured object as the object is additively manufactured. In the computing residual stress and deformation, when a temperature increment following the time series data is given, dynamic explicit FEM is employed to compute the additively manufactured object's displacement and stress until a prescribed static equilibrium condition is reached, and once the displacement has reached the static equilibrium condition, the temperature increment is given again and the displacement and stress are computed again. The temperature increment is set in magnitude to have a value larger in magnitude than a temperature increment used in the thermal-elastic-plastic analysis of the additively manufactured object using static implicit FEM. The additively manufactured object is heated with an instantaneous surface heat source having a heat input quantity adjusted with respect to a heat input quantity applied when a moving heat source is used to heat the additively manufactured object.

Furthermore, according to the present disclosure, an analysis apparatus used to analyze an additively manufactured object is an analysis apparatus that analyzes residual stress and deformation caused in an additively manufactured object manufactured by solidifying a molten material on a surface layer, and comprises an input unit and a computation unit. The input unit receives data for performing a thermal-elastic-plastic analysis of the additively manufactured object by employing a finite element method (FEM). The computation unit computes residual stress and deformation caused in the additively manufactured object, by performing the thermal-elastic-plastic analysis in accordance with time series data of a temperature distribution caused in the additively manufactured object as the object is additively manufactured. When a temperature increment following the time series data is given, the computation unit computes the additively manufactured object's displacement and stress by employing dynamic explicit FEM until a prescribed static equilibrium condition is reached, and once the displacement has reached the static equilibrium condition, the temperature increment is given again and the computation unit again computes the displacement and stress. The temperature increment is set in magnitude to have a value larger in magnitude than a temperature increment used in the thermal-elastic-plastic analysis of the additively manufactured object using static implicit FEM. The additively manufactured object is heated with an instantaneous surface heat source having a heat input quantity adjusted with respect to a heat input quantity applied when a moving heat source is used to heat the additively manufactured object.

In the above method and apparatus for analyzing an additively manufactured object, when a temperature increment following time series data is given, dynamic explicit FEM is employed to compute the additively manufactured object's displacement and stress until a prescribed static equilibrium condition is reached, and once the displacement has reached the static equilibrium condition, a temperature increment is given again and displacement and stress are computed again (idealized explicit FEM). According to such an idealized explicit FEM, a solution converges even when a large temperature increment is given, and accordingly, in the present analysis method and apparatus, a temperature increment larger in magnitude than that used in a thermal-elastic-plastic analysis using static implicit FEM is given (a large temperature increment). This can contribute to a reduced number of computations and hence a reduced computing time. Moreover, in the present analysis method and apparatus, the additively manufactured object is heated by an instantaneous surface heat source after a heat input quantity is adjusted, which also contributes to a reduced computing time (an instantaneous heat source model). Therefore, the presently disclosed method and apparatus for analyzing an additively manufactured object can achieve a significantly reduced computing time.

Preferably, the additively manufactured object is heated such that a topmost layer of the additively manufactured object divided into a plurality of blocks is heated for each block. Each block is heated by the above instantaneous surface heat source.

Still preferably, the additively manufactured object is heated in a heating pattern in which at least two blocks that are not adjacent to each other are simultaneously heated.

This allows heating to be done for each plurality of blocks and can thus contribute to a further reduced computing time (a simultaneous heating pattern).

Preferably, the instantaneous surface heat source has the heat input quantity adjusted with respect to the heat input quantity applied when the moving heat source is used to heat the additively manufactured object, so that the additively manufactured object shrinks in an amount equivalent to that when the moving heat source is used to heat the additively manufactured object.

Preferably, the material is metal, and the temperature increment has a magnitude of at least 100° C. or higher.

Preferably, the temperature increment is determined in magnitude based on a mechanical melting temperature of a metal constituting the additively manufactured object.

Furthermore, according to the present disclosure, a method for additively manufacturing an object is a method for additively manufacturing an object by depositing a molten material while solidifying the material, comprising: determining a heating pattern applied in heating a topmost layer of the additively manufactured object, based on a result of an analysis using the method described above; and heating the additively manufactured object according to the heating pattern.

Furthermore, according to the present disclosure, an apparatus used to additively manufacture an object is an apparatus used to additively manufacture an object by depositing a molten material while solidifying the material, comprising: a heating device that heats a topmost layer of the additively manufactured object; and a controller that controls the heating device. The controller determines a heating pattern to be applied in heating the topmost layer of the additively manufactured object, based on a result of an analysis using the above method, and controls the heating device to heat the additively manufactured object according to the heating pattern.

According to the above manufacturing method and apparatus, by a result of an analysis using the above analysis method, a heating pattern which suppresses residual stress and deformation can be determined and an additively manufactured object can be manufactured in accordance with the heating pattern.

Furthermore, according to the present disclosure, a method for additively manufacturing an object is a method for additively manufacturing an object by depositing a molten material while solidifying the material. The additively manufactured object is heated such that a topmost layer of the additively manufactured object divided into a plurality of blocks is heated for each block. The method comprises: heating a most peripherally located block; and heating a block inner than the most peripherally located block after the most peripherally located block is heated.

Furthermore, according to the present disclosure, an apparatus used to additively manufacture an object is an apparatus used to additively manufacture an object by depositing a molten material while solidifying the material, comprising: a heating device that heats a topmost layer of the additively manufactured object; and a controller that controls the heating device such that the topmost layer divided into a plurality of blocks is heated for each block. The controller controls the heating device to heat a most peripherally located block and thereafter heat a block inner than the most peripherally located block.

The above manufacturing method and apparatus can suppress residual stress caused in a most peripheral part of an additively manufactured object.

The presently disclosed method and apparatus for analyzing an additively manufactured object can achieve a significantly reduced computing time.

Furthermore, the presently disclosed method and apparatus for additively manufacturing an object can suppress residual stress caused in a most peripheral part of the additively manufactured object.

BRIEF DESCRIPTION OF DRAWINGS

FIG. 20 is a flowchart of an example procedure of a process performed by a controller.

DESCRIPTION OF EMBODIMENTS

Hereinafter, embodiments of the present disclosure will be described in detail with reference to the drawings. In the figures, identical or corresponding components are identically denoted and will not be described redundantly.

Figure 1:
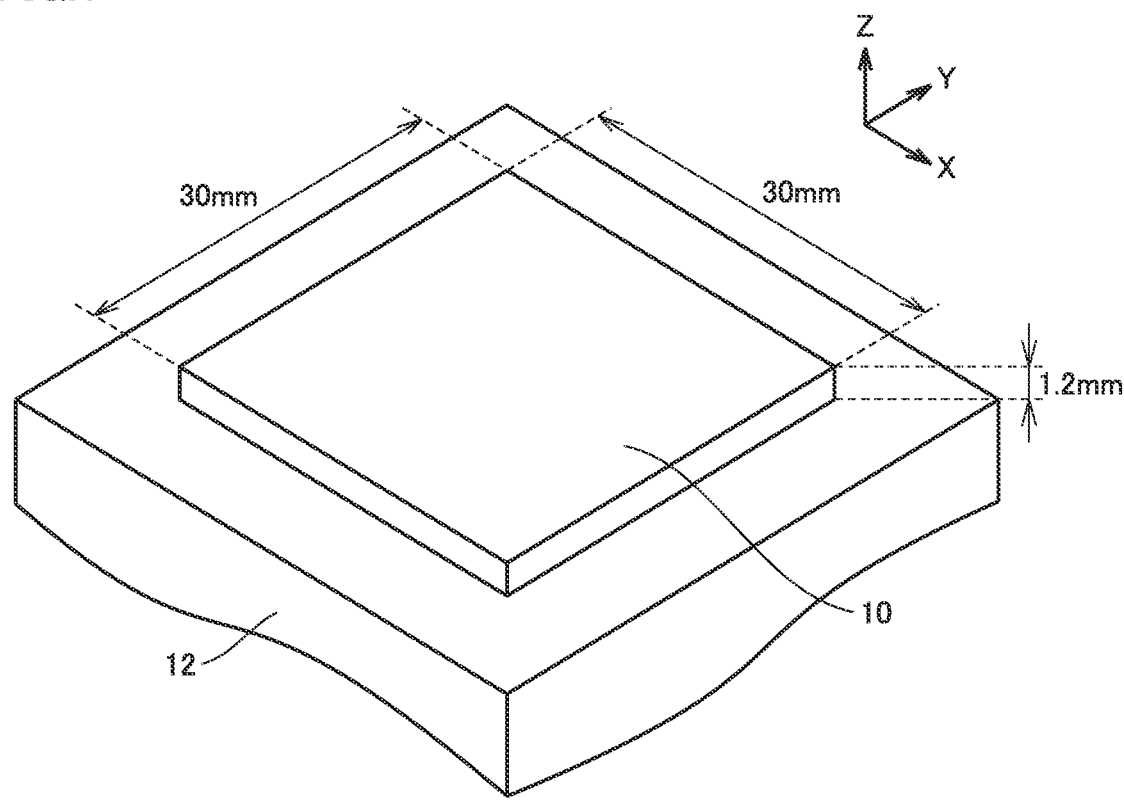
FIG. 1 shows an analysis model of a metal additive manufactured object which is an example of an additively manufactured object analyzed in an analysis method according to an embodiment of the present disclosure.

FIG. 1 shows an analysis model of a metal additive manufactured object which is an example of an additively manufactured object analyzed in an analysis method according to an embodiment of the present disclosure. While FIG. 1 shows a simple model having a rectangular structure as an example, a model analyzable in the present analysis method is not limited to the model having the structure shown in FIG. 1.

Figure 2:
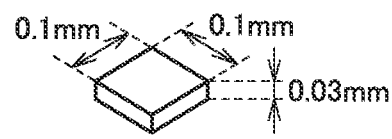
FIG. 2 shows an element of the analysis model.

Referring to FIG. 1, this analysis model 10 models a metal additive manufactured object (an analysis target) additively manufactured on a base plate 12 by a metal 3D printer (not shown). In this example, analysis model 10 is assumed to have a size of 30 mm×30 mm×1.2 mm. Analysis model 10 is composed of elements each having a dimension of 0.1 mm×0.1 mm×0.03 mm as shown in FIG. 2 in view of a size of a laser, which will be described hereinafter, used for irradiation in additive manufacturing. Therefore, analysis model 10 is composed of 3.6 million elements in 40 layers.

Figure 3:
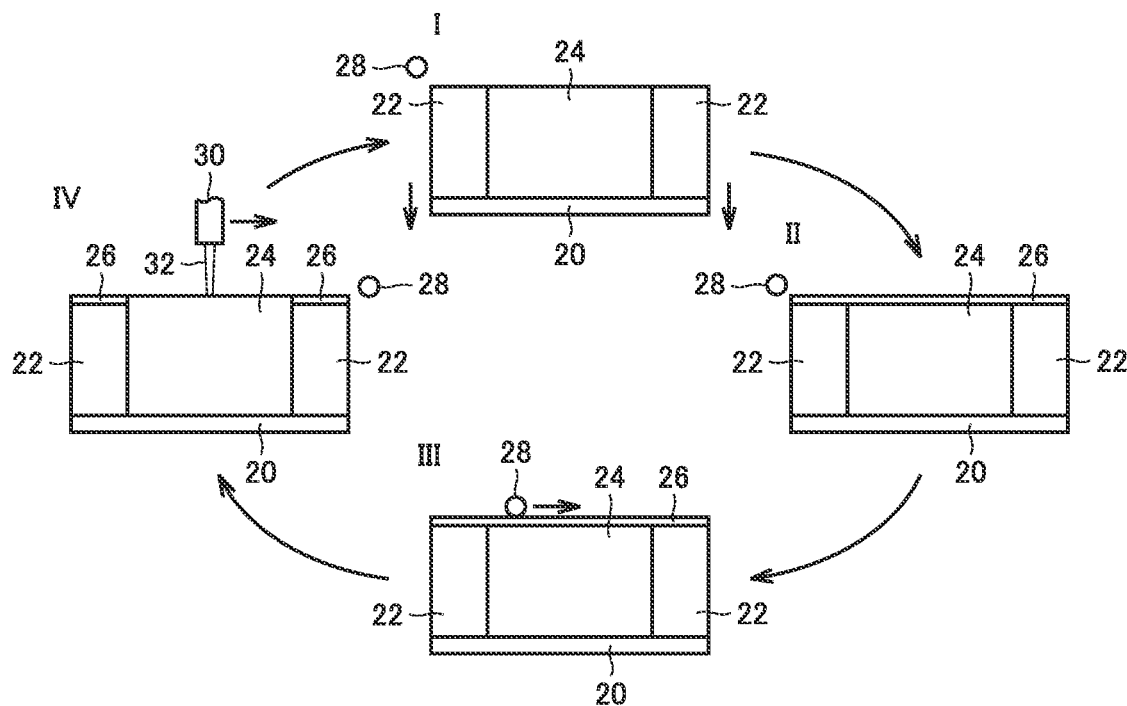
FIG. 3 shows an example of a method for manufacturing a metal additive manufactured object with a metal 3D printer.

FIG. 3 shows an example of a method for manufacturing a metal additive manufactured object with a metal 3D printer. While FIG. 3 shows a laser melting method in which metal powder of material is irradiated with a laser and thus molten, an electron beam melting method in which metal powder is irradiated with an electron beam and thus molten or the like is also applicable to the presently disclosed analysis method.

Further, while FIG. 3 shows an SLM (Selective Laser Melting) method in which a powder bed in which metal powder of material is spread is selectively irradiated with a laser to perform additive manufacturing, LMD (Laser Metal Deposition) or the like in which metal powder is injected and irradiated with a laser simultaneously to perform additive manufacturing is also applicable to the presently disclosed analysis method.

With reference to FIG. 3, an elevator 20 on which an intermediate, additively manufactured part 24 manufactured in step IV, which will be described hereinafter, and metal powder 22 are placed is moved downward by the thickness of one layer (Step I). Subsequently, metal powder 26 for a subsequent layer is supplied onto intermediate additively manufactured part 24 and metal powder 22 (step II). Subsequently, metal powder 26 is leveled by a roller blade 28 (step III). Then, an additive manufacturing area is preheated and thereafter a laser 32 output from torch 30 is used as a heat source to selectively melt and solidify (or sinter) metal powder 26 to thus additively manufacture a surface layer (step IV). By repeatedly performing such a series of steps I to IV, additive manufacturing is performed to manufacture a desired metal additive manufactured object.

Figure 4:
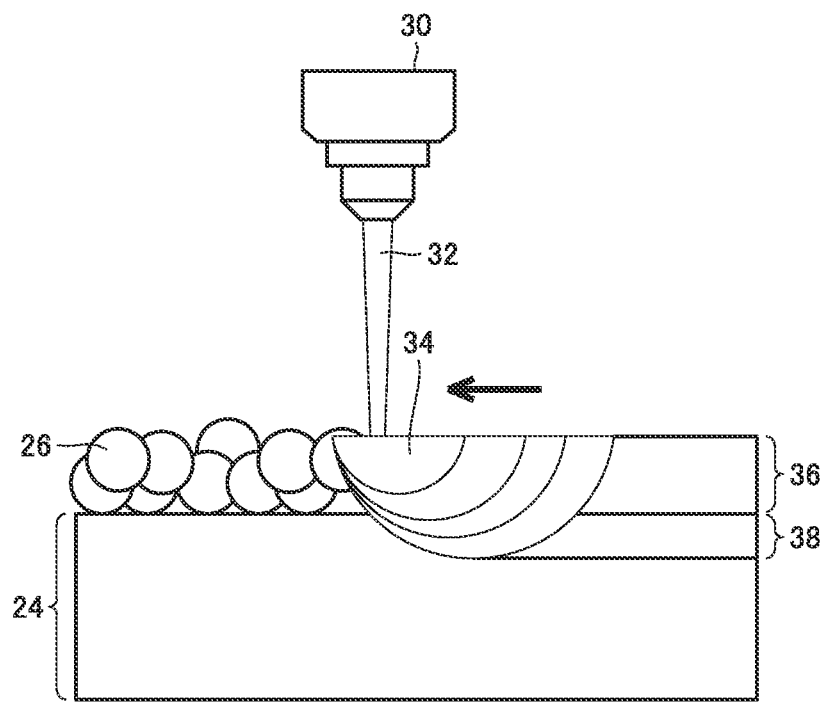
FIG. 4 shows a manner of additively manufacturing a surface layer by a laser melting method.

FIG. 4 shows a manner of additively manufacturing a surface layer by a laser melting method. Referring to FIG. 4, metal powder 26 additionally supplied on solidified, intermediate, additively manufactured part 24 is irradiated with laser 32 while torch 30 is moved. Metal powder 26 irradiated with laser 32 melts a surface of the underlying intermediate additively manufactured object 24 while forming a melt pool 34, and thus forms a new layer 36 bonded to a heat-affected zone 38 formed in a surface layer of intermediate additively manufactured part 24.

Although not shown in the figure, additive manufacturing by an electron beam melting method in which an electron beam is used instead of laser 32 is also similarly performed.

Referring to FIG. 1 again, in the present embodiment, analysis model 10 is subjected to a thermal-elastic-plastic analysis using FEM. This allows residual stress and deformation caused in a metal additive manufactured object which is an analysis target by analysis model 10 to be estimated with a computer, and effects of various factors such as stress and deformation caused in the additively manufactured object can be easily examined and how many times a product is prototyped can be reduced to contribute to cost reduction.

Such a thermal-elastic-plastic analysis is generally conducted using static implicit FEM, which requires sequentially solving a stiffness equation (multidimensional simultaneous linear equations) for the entire system at each computation step, and in reality it is difficult in view of computing time to apply static implicit FEM to an analysis of additive manufacturing of a metal additive manufactured object of a large scale as shown in FIG. 1.

Accordingly, in the analysis method according to the present embodiment, idealized explicit FEM that can analyze a large-scale structure's residual stress and deformation without the necessity of solving simultaneous equations at each computation step as in static implicit FEM is used to subject analysis model 10 to a thermal-elastic-plastic analysis. And according to idealized explicit FEM, even when a temperature increment, which is a temperature step applied when computation is performed, and assumes a negative value in a cooling process, is increased, a solution converges, and accordingly, in the analysis method according to the present embodiment, a temperature increment (e.g., 100° C. or higher) larger in magnitude than that used in a thermal-elastic-plastic analysis using static implicit FEM, which is generally assumed to be a temperature increment of 15° C. or 30° C., can be given (a large temperature increment). This can contribute to a reduced number of computations required for analysis, and hence a reduced computing time.

The analysis method according to the present embodiment employs a heating model for analysis model 10 such that heating is performed with an instantaneous surface heat source having a heat input quantity adjusted with respect to a heat input quantity applied when heating is performed by a moving heat source heating while moving laser 32 at a prescribed speed (an instantaneous heat source model).

Furthermore, the heating model for analysis model 10 may be such that heating is performed in a random order for each plurality of blocks according to a heating pattern in which at least two blocks that are not adjacent to each other are simultaneously heated (a simultaneous heating pattern). Note that being "simultaneous" only requires being substantially simultaneous, and may not necessarily be completely simultaneous. Moreover, the order of heating may not necessarily be random, and may be regular. In the analysis method according to the present embodiment, heating is performed according to such a simultaneous heating pattern, and heating is performed with an instantaneous surface heat source using an instantaneous heat source model in each block. This can contribute to a significantly reduced computing time required for analysis.

Thus, according to the analysis method according to the present embodiment, a "large temperature increment" and an "instantaneous heat source model" as described above can be employed, and further, a "simultaneous heating pattern" as described above can also be employed to significantly reduce a computing time required for analysis.

In the following, initially, thermal-elastic-plastic analysis using idealized explicit FEM will be briefly described, and a feature of the present embodiment, that is, a "large temperature increment," a "simultaneous heating pattern," and an "instantaneous heat source model," will be described in detail.

<Thermal-Elastic-Plastic Analysis Using Idealized Explicit FEM>

Figure 5:
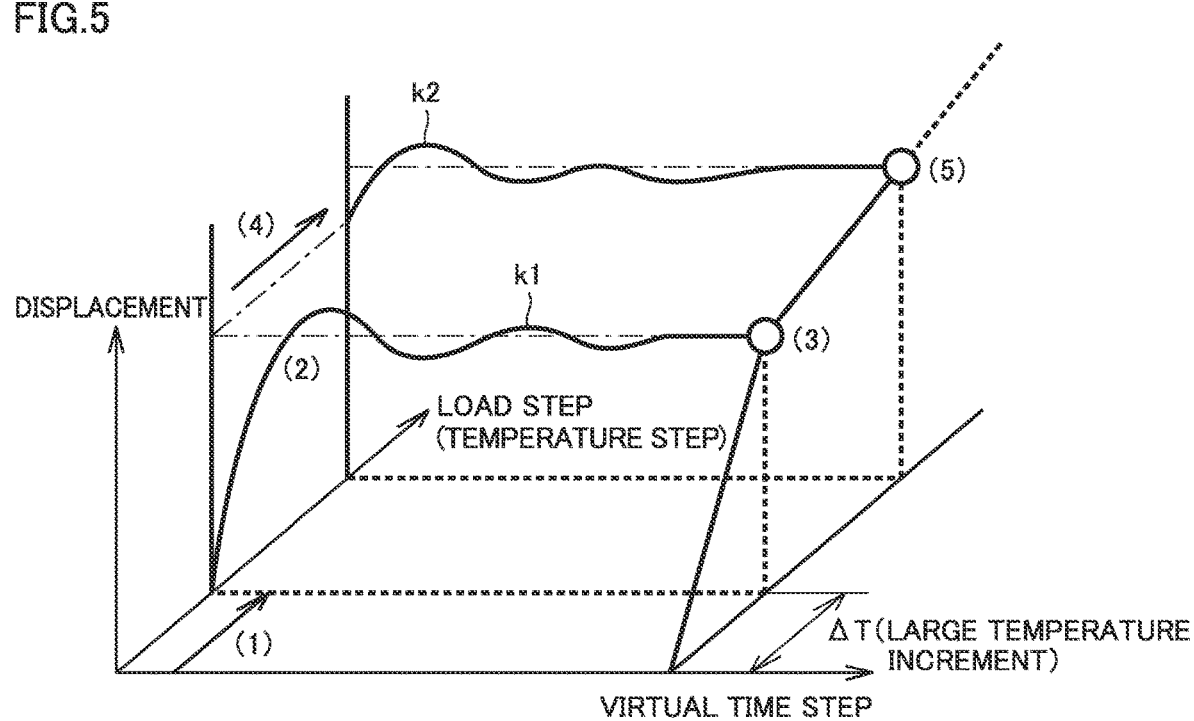
FIG. 5 conceptually illustrates a thermal-elastic-plastic analysis using idealized explicit FEM.

FIG. 5 conceptually illustrates a thermal-elastic-plastic analysis using idealized explicit FEM. With reference to FIG. 5, the thermal-elastic-plastic analysis using idealized explicit FEM proceeds as follows:

Idealized explicit FEM employs a balance equation represented by the following expression (1), where a nodal displacement vector at a time t is represented by $\{u\}_t$:

[expression 1]

$$[M]\{\ddot{u}\}_t + [C]\{\dot{u}\}_t + [K]\{u\}_t = \{F\}_t \quad (1)$$

where [M] represents a mass matrix, [C] represents a damping matrix, [K] represents a stiffness matrix, and $\{F\}_t$ represents a load vector. Note that the mass matrix [M] and the damping matrix [C] are adjusted to a lumped diagonal matrix.

In a thermal-elastic-plastic analysis, time series data of a temperature distribution of an analysis target (in the present embodiment, analysis model 10) is given as input data, and in idealized explicit FEM, the time series data of the temperature distribution is computed by a heat conduction analysis described hereinafter, and a load caused by a temperature increment based on the time series data of the temperature distribution is given as the load vector of expression (1) (a load step (1) in FIG. 5).

And by solving the expression (1) for this load step (or temperature step), a displacement in this load step (or temperature step) is determined (a curve k1). Specifically, a displacement is obtained by solving the expression (1) for each virtual time step by employing dynamic explicit FEM, and until the displacement reaches a static equilibrium state, that is, until in the expression (1) an effect of inertia and damping terms becomes negligibly small and the displacement converges to a value equivalent to a solution obtained in static implicit FEM, the displacement is repeatedly computed ((2) in FIG. 5).

Once the displacement has reached the static equilibrium state ((3) in FIG. 5), the load step (or temperature step) is advanced ((4) in FIG. 5). Then, a displacement for this load step (or temperature step) is determined (a curve k2), and computation is repeatedly performed using dynamic explicit FEM until the displacement reaches the static equilibrium state ((5) in FIG. 5).

While idealized explicit FEM involves division into virtual time steps in advancing an analysis and thus entails an increased number of computation steps, it does not require solving simultaneous equations for each step in contrast to static implicit FEM. Therefore, idealized explicit FEM requires a much smaller amount of computation for each computation step than static implicit FEM. Furthermore, in idealized explicit FEM, a convergence computation is performed so as to satisfy a static equilibrium condition for each load step (or temperature step), and better analysis accuracy is provided than in a method simply using dynamic explicit FEM.

<Large Temperature Increment>

According to the above-described idealized explicit FEM, a solution converges even when a large temperature step (or load step) is applied. Accordingly, in the analysis method according to the present embodiment, a temperature step larger than a temperature step used in a thermal-elastic-plastic analysis using static implicit FEM is provided (a large temperature increment). In general, in a thermal-elastic-plastic analysis using static implicit FEM, a solution does not converge when a large temperature step is applied, and accordingly, it is necessary to suppress a temperature step (or temperature increment) to be as small as 15° C. or 30° C., whereas in the analysis method according to the present embodiment, a load step corresponding to a temperature step (or temperature increment) of 100° C. or higher is given. This can contribute to a reduced number of computations required for analysis, and hence a reduced computing time.

<Simultaneous Heating Pattern and Instantaneous Heat Source Model>

Figure 6:
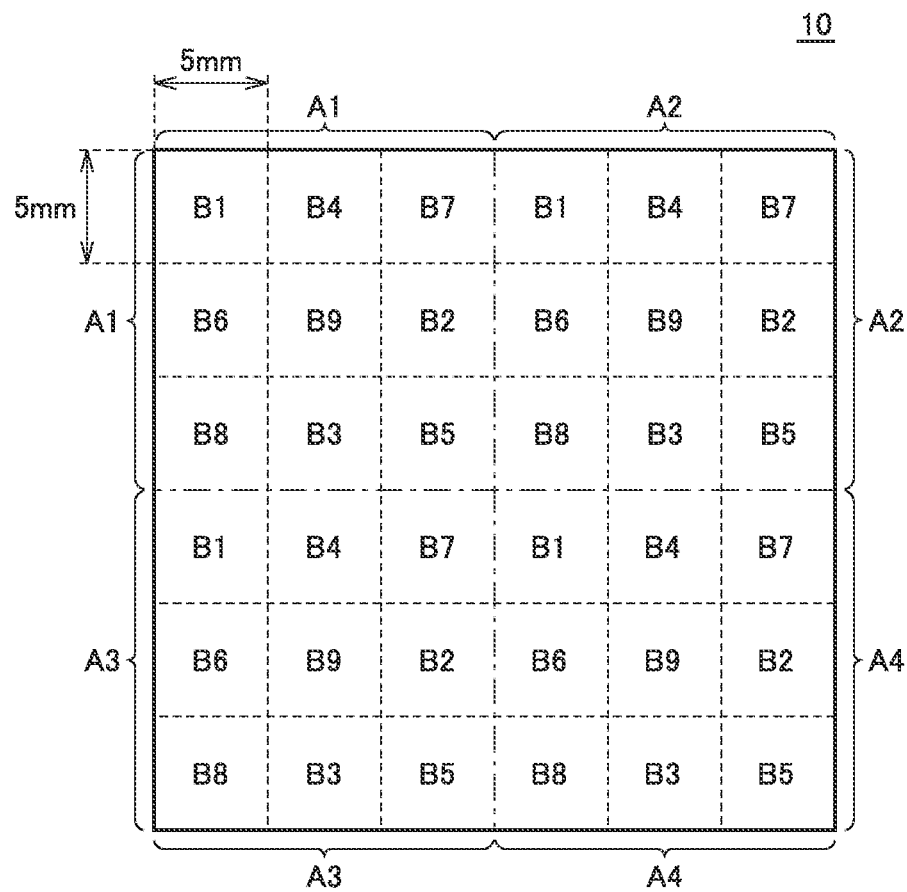
FIG. 6 is a plan view of the analysis model shown in FIG. 1.

FIG. 6 is a plan view of analysis model 10 shown in FIG. 1. Referring to FIG. 6, in the present embodiment, analysis model 10 has a topmost layer (or top surface) divided into a plurality of blocks, of which four blocks which are not adjacent to one another are heated simultaneously, thereby achieving a reduced computing time.

Specifically, in this example, analysis model 10 has the topmost layer (or a surface to be heated by a laser) divided into four areas A1-A4, and each of areas A1-A4 is further divided into nine blocks B1-B9. Initially, it is assumed that areas A1-A4 have their respective blocks B1 heated simultaneously. Subsequently, it is assumed that areas A1-A4 have their respective blocks B2 heated simultaneously, and thereafter have their respective blocks Bi heated simultaneously and thus sequentially. That is, in this example, it is assumed that four blocks Bi are heated simultaneously.

Each area has each block heated in a random order. While in the above description it is assumed that the heating is performed in an order of B1→B2→..., heating each block is not limited to this order.

How the model is divided into areas and blocks is not limited to the above, either. While in the above description, as one example, it is assumed that each area is divided into 3×3 blocks, each area may not be divided into blocks or each area may be divided into blocks such as 5×5 blocks and 20×20 blocks. And for these cases as well, it is assumed that each area has each block heated in a random order.

Note that, as has been set forth above, being "simultaneous" only requires being substantially simultaneous, and may not necessarily be completely simultaneous. Moreover, the order of heating may not necessarily be random, and may be regular.

Note that the blocks to be simultaneously heated are determined not to be adjacent to one another so that residual stress depending on the heating method does not remain. In the example shown in FIG. 6, an order of heating blocks B1-B9 in areas A1-A4 is determined so that the four blocks to be heated simultaneously are not adjacent to one another.

Furthermore, in this example, each block is heated in a method using a surface heat source having a heat input quantity adjusted with respect to a heat input quantity applied when a moving heat source is used to heat the block.

Figure 7:
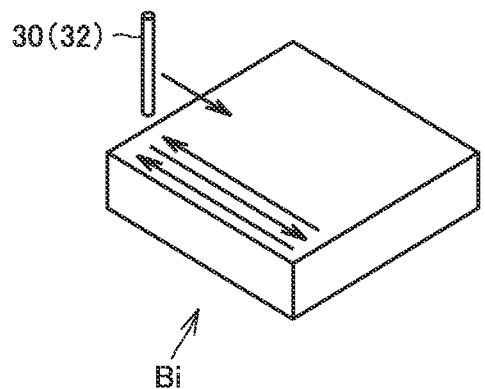
FIG. 7 shows a moving heat source heating each block as a comparative example.
Figure 8:
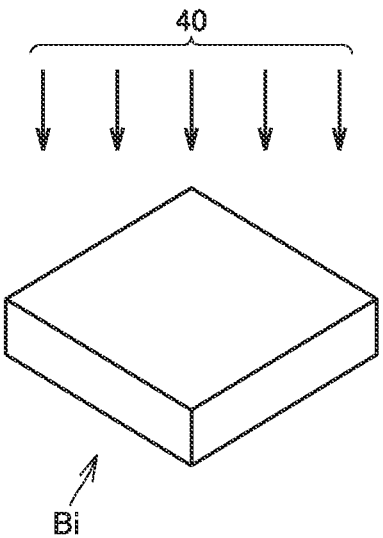
FIG. 8 shows an instantaneous surface heat source heating each block.

FIG. 7 is a diagram showing how each block is heated by a moving heat source model as a comparative example, and FIG. 8 shows how each block is heated by an instantaneous heat source model (a surface heat source). Referring to FIG. 7, the moving heat source follows an actual heating method, and while a heat source (torch 30 and laser 32) is moved, several elements are heated at a time, resulting in a long computing time. In contrast, referring to FIG. 8, in the instantaneous heat source model, it is assumed that a block's topmost layer has its elements all heated by surface heat source 40 simultaneously. This can contribute to a significantly reduced computing time. Note that it can be said that surface heat source 40 corresponds to a moving heat source having its moving speed made infinite.

In the instantaneous heat source model (or with a surface heat source), all of elements to be heated each receive heat of an adjacent element simultaneously, and when a heat input quantity (J) equal to that of a moving heat source is given in the instantaneous heat source model, a synergistic effect occurs and an additively manufactured object tends to shrink in a larger amount than when the moving heat source is used. Accordingly, in the analysis method according to the present embodiment, a heat input quantity is adjusted with respect to that when a moving heat source is used, which corresponds to actual heating, by using the following correction coefficient $\eta 0$:

$$\eta 0 = (\text{heat input quantity of instantaneous surface heat source})/(\text{heat input quantity of moving heat source}) \quad (2)$$

Thus, in the analysis method according to the present embodiment, it is assumed that a simultaneous heating pattern is used to heat each plurality of blocks, and furthermore, for each block, an instantaneous heat source model (a surface heat source) is adopted rather than a moving heat source. By adopting such a heating model together with the large temperature increment described above, a computing time required for an analysis can be significantly reduced.

<Analysis System>

Figure 9:
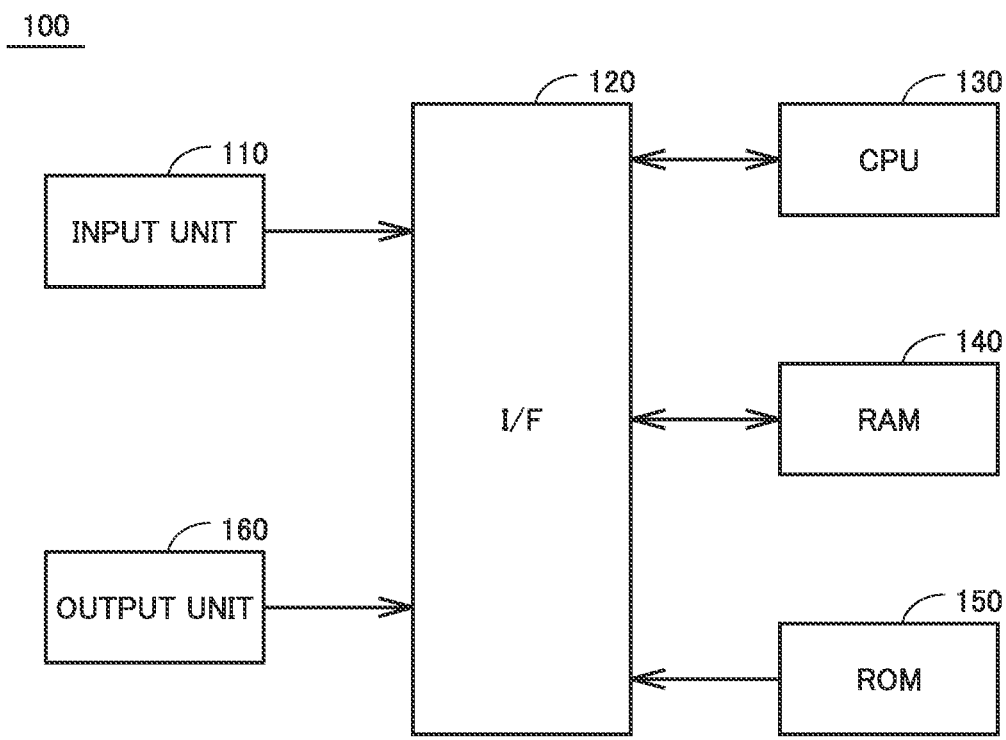
FIG. 9 is a block diagram showing major components of a hardware configuration of an analysis apparatus according to the present embodiment.

FIG. 9 is a block diagram showing major components of a hardware configuration of an analysis apparatus according to the present embodiment. Referring to FIG. 9, analysis apparatus 100 includes an input unit 110, an interface (I/F) unit 120, a CPU (Central Processing Unit) 130, a RAM (Random Access Memory) 140, a ROM (Read Only Memory) 150 and an output unit 160.

CPU 130 implements the analysis method according to the present embodiment by executing various programs stored in ROM 150. RAM 140 is used as a working area by CPU 130. ROM 150 stores a program including each step of a flowchart (to be described hereinafter) showing a procedure of the analysis method according to the present embodiment. Input unit 110 is a means for reading data externally such as via a keyboard, a mouse, a storage medium, and a communication device. Output unit 160 is a means for outputting a computation result provided by CPU 130, such as a display, a storage medium, and a communication device.

Figure 10:
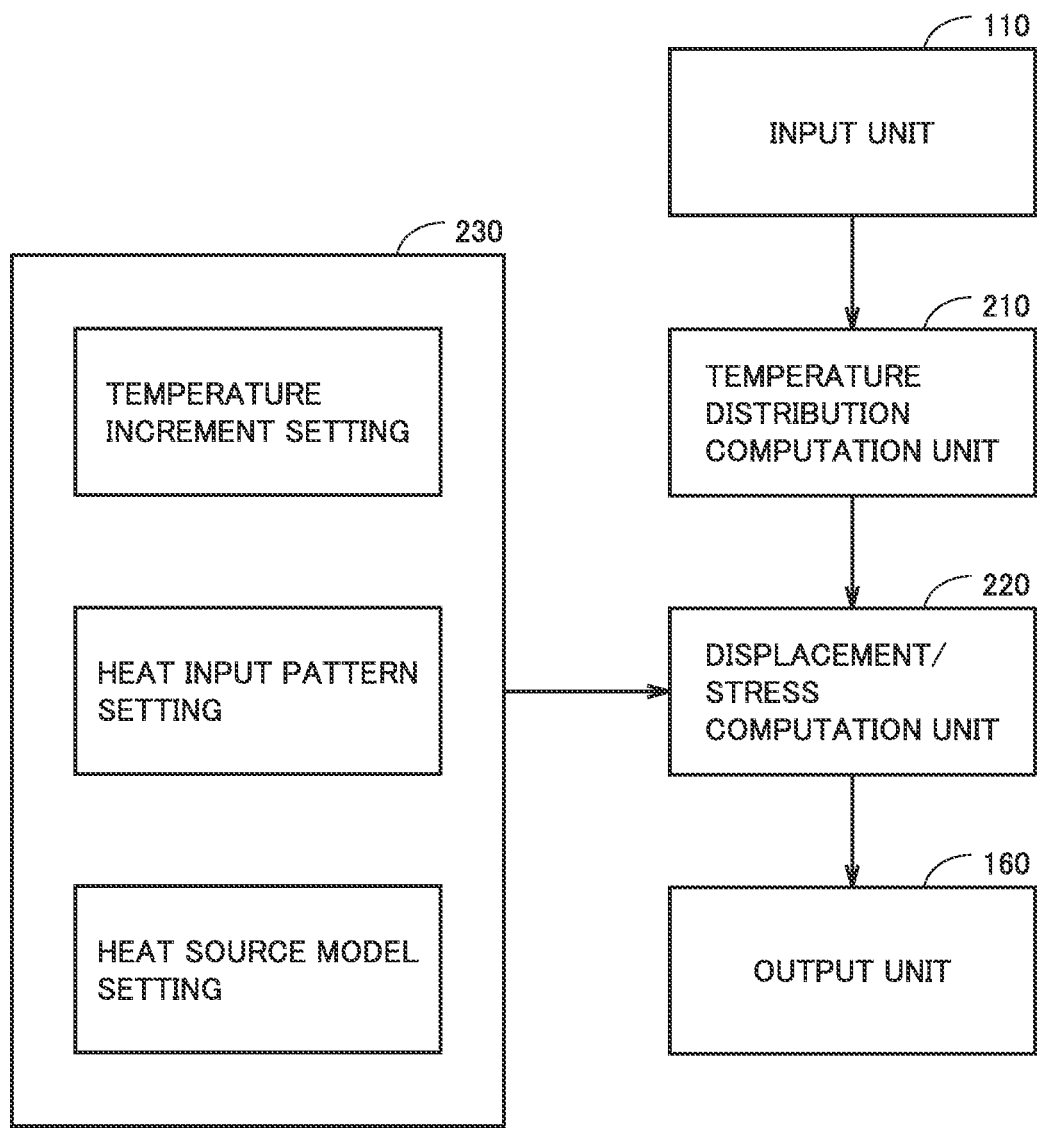
FIG. 10 is a functional block diagram functionally showing a configuration of the analysis apparatus shown in FIG. 9.

FIG. 10 is a functional block diagram functionally showing a configuration of analysis apparatus 100 shown in FIG. 9. Referring to FIG. 10, analysis apparatus 100 includes a temperature distribution computation unit 210, a displacement/stress computation unit 220, a simplified computation setting unit 230, and input unit 110 and output unit 160 described above.

A variety of types of data necessary for an FEM heat conduction analysis (described hereinafter) performed in temperature distribution computation unit 210 is input to input unit 110. As an example, data such as shape/dimension/FEM element information of the analysis target (in the present embodiment, analysis model 10), a heat source model, temperature dependence of material constants (e.g., specific heat, density, thermal conductivity coefficient, etc.), temperature dependence of an object surface characteristic (a heat transfer coefficient), a boundary condition, analysis conditions (time increment, initial temperature, inter-pass temperature, element type, etc.) are received.

Further, a variety of types of data necessary for the FEM thermal-elastic-plastic analysis performed in displacement/stress computation unit 220 is input to input unit 110. As an example, in addition to the above data, data is received such as temperature dependence of material constants (Young's modulus, yield stress, Poisson's ratio, linear expansion coefficient, work hardening coefficient, etc.), selection of various models (hardening rule, yield condition, creep, phase transformation, geometric linearity/non-linearity, etc.), a mechanical boundary condition, a geometric boundary condition, an analysis condition (element type, etc.).

Temperature distribution computation unit 210 computes time series data of a temperature distribution of the analysis target (or analysis model 10) by conducting an FEM heat conduction analysis using a variety of types of data received from input unit 110. For the FEM heat conduction analysis, a variety of known FEM heat conduction analysis methodologies can be used.

Displacement/stress computation unit 220 receives the variety of types of data received from input unit 110 and also receives from temperature distribution computation unit 210 the time series data of the temperature distribution of the analysis target (or analysis model 10) computed by temperature distribution computation unit 210. Further, displacement/stress computation unit 220 receives from simplified computation setting unit 230 settings of a temperature increment $\Delta T$, a heat input pattern, and a heat source model set in simplified computation setting unit 230.

Simplified computation setting unit 230 performs various settings for simplifying a thermal-elastic-plastic analysis computation using idealized explicit FEM that is performed in displacement/stress computation unit 220.

Specifically, simplified computation setting unit 230 sets a temperature increment $\Delta T$ for the thermal-elastic-plastic analysis computation using idealized explicit FEM. The temperature increment $\Delta T$ is set in magnitude to have a value larger than a temperature increment (generally 15° C. or 30° C.) used in a thermal-elastic-plastic analysis computation using static implicit FEM, and in the present embodiment, simplified computation setting unit 230 sets a prescribed temperature increment ΔT of 100° C. or higher.

Note that temperature increment ΔT may be determined in magnitude based on the mechanical melting temperature of metal constituting a metal additive manufactured object. For example, when metal constituting a metal additive manufactured object is iron, iron has a mechanical melting temperature of about 750 to 800° C., and accordingly, based on such a mechanical melting temperature, the temperature increment ΔT may be set in magnitude to a level of several hundred degrees centigrade.

Furthermore, simplified computation setting unit 230 sets a heat input pattern for the thermal-elastic-plastic analysis computation using idealized explicit FEM. Specifically, as has been described with reference to FIG. 6, simplified computation setting unit 230 divides the topmost layer (a laser-heated surface) of analysis model 10 into a plurality of areas A1-A4 and divides each area into a plurality of blocks B1-B9, and sets a heat input pattern so that four blocks Bi which are not adjacent to one another are heated simultaneously and each group of such four blocks Bi is heated sequentially.

Further, simplified computation setting unit 230 sets a heat source model for the thermal-elastic-plastic analysis computation using idealized explicit FEM. Specifically, simplified computation setting unit 230 sets as a heat source model for heating each block as described above an instantaneous heat source model (a surface heat source) having a heat input quantity adjusted using the correction coefficient $\eta 0$ indicated above by expression (2) with respect to a heat input quantity applied when a moving heat source is used to heat the block, which corresponds to actual heating.

Then, displacement/stress computation unit 220 uses the variety of types of data received from input unit 110 and the time series data of the temperature distribution of the analysis target (or analysis model 10) received from temperature distribution computation unit 210 and follows settings of a temperature increment ΔT, a heat input pattern, and a heat source model that are set by simplified computation setting unit 230 to perform an FEM thermal-elastic-plastic analysis to compute time series data of residual stress and displacement caused in the analysis target (or analysis model 10).

Output unit 160 receives the time series data of residual stress and displacement computed by displacement/stress computation unit 220. Output unit 160 may be a display which displays time series data of residual stress and displacement computed, a writing means for writing the data to a storage medium in a prescribed format, a communication device which externally transmits the data in a prescribed format, and/or the like.

Figure 11:
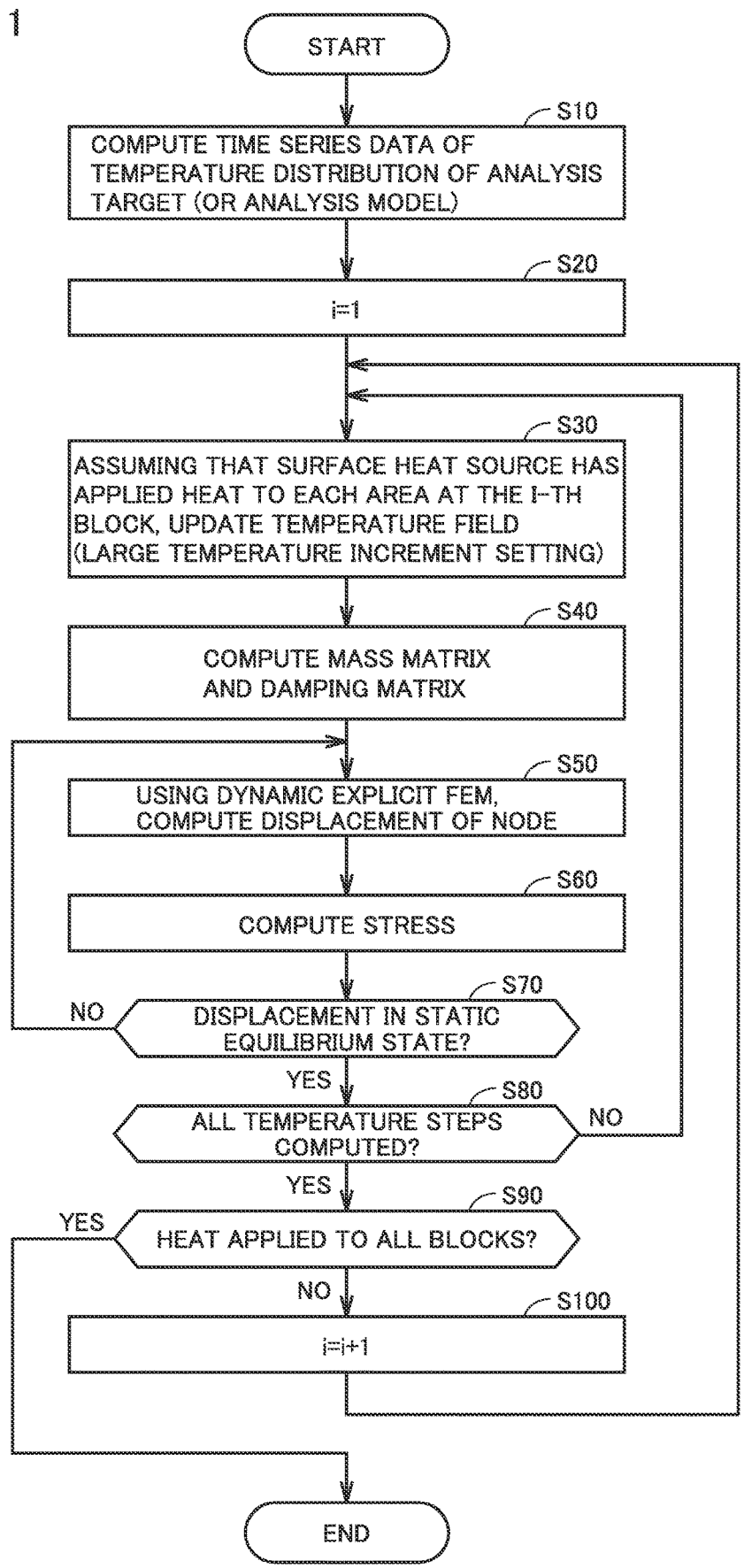
FIG. 11 is a flowchart for illustrating a procedure of a process of an FEM thermal-elastic-plastic analysis performed by the analysis apparatus shown in FIG. 9.

FIG. 11 is a flowchart for illustrating a procedure of a process of the FEM thermal-elastic-plastic analysis performed by analysis apparatus 100 shown in FIG. 9. Referring to FIG. 11, analysis apparatus 100 computes time series data of a temperature distribution of the analysis target (or analysis model 10) by conducting an FEM heat conduction analysis (step S10). Subsequently, analysis apparatus 100 sets a counter i to an initial value of 1 (step S20). The counter i is used to select a block to be heated according to the heat input pattern.

Subsequently, analysis apparatus 100 assumes that the instantaneous surface heat source has applied heat to each of areas A1-A4 (see FIG. 6) at the i-th block, and updates a temperature field (temperature increment ΔT) (step S30). As has been discussed above, the temperature increment ΔT is set to be a large temperature increment and has a value (a prescribed value of 100° C. or higher) larger than a temperature increment (about 15° C. or 30° C.) used in a thermal-elastic-plastic analysis computation using static implicit FEM.

Subsequently, analysis apparatus 100 computes a mass matrix [M] and a damping matrix [C] of the balance equation represented by the above expression (1) using the variety of types of data read from input unit 110 (step S40).

Then, analysis apparatus 100 gives a load caused by the temperature increment ΔT as a load vector of the expression (1), and solves the expression (1) using dynamic explicit FEM to compute a displacement of each node (step S50). Once the displacement has been computed, analysis apparatus 100 computes stress from the computed displacement using the variety of types of data read from input unit 110 (step S60).

Subsequently, analysis apparatus 100 determines whether the computed displacement has reached the static equilibrium state (step S70). When the displacement has not reached the static equilibrium state (NO in step S70), analysis apparatus 100 returns to step S50, advances the virtual time step and re-computes displacement for each node by dynamic explicit FEM.

When it is determined in step S70 that the displacement has reached the static equilibrium state (YES in step S70), analysis apparatus 100 determines whether all temperature steps have undergone computation (step S80). When it is determined that there is any temperature step that has not undergone computation (NO in step S80), analysis apparatus 100 returns the process to step S30, and advances the current temperature step and updates the temperature field (by temperature increment ΔT).

When it is determined in step S80 that all temperature steps have undergone computation (YES in step S80), analysis apparatus 100 determines whether heat has been applied to all blocks (step S90). When it is determined that there is an unheated block (NO in step S90), analysis apparatus 100 increments counter i (step S100) and returns the process to step S30. As a result, analysis apparatus 100 shifts to a block to be heated and performs the series of steps S30 to S80 again. When it is determined in step S90 that heat has been applied to all blocks (YES in step S90), the process proceeds to the end, and the process of the thermal-elastic-plastic analysis ends.

Figure 12:
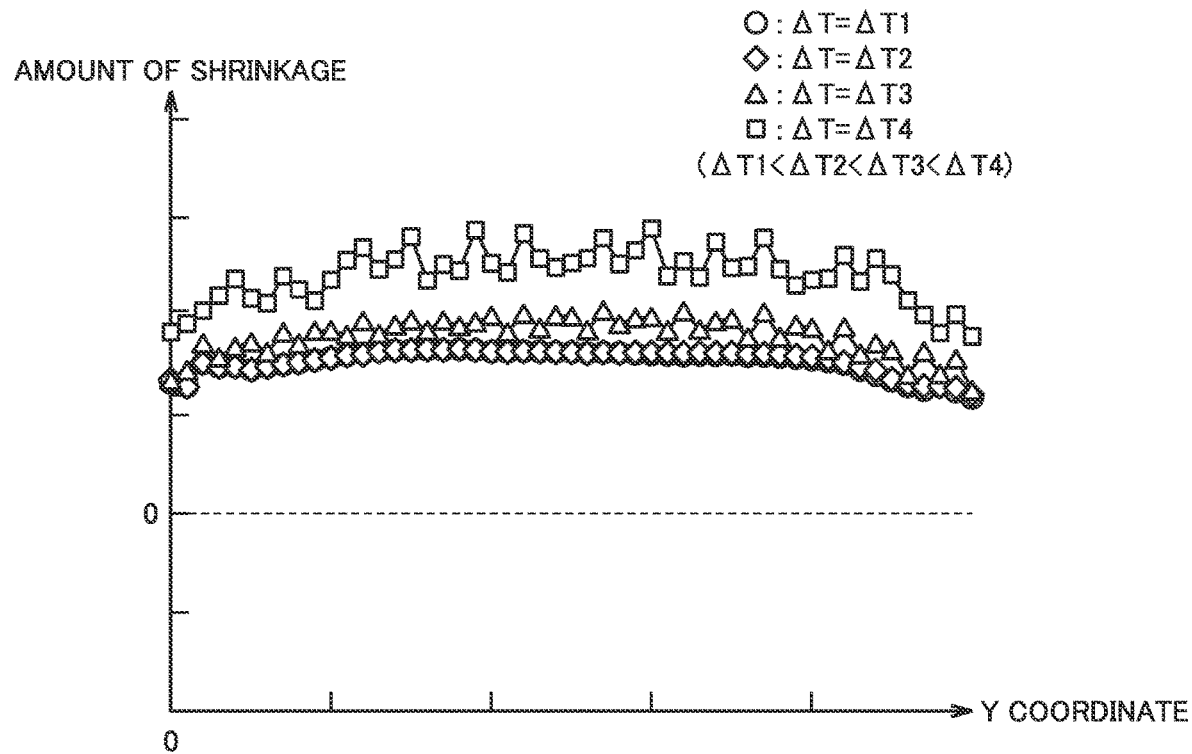
FIG. 12 represents an amount of shrinkage of an analysis target when a temperature increment is varied.

FIG. 12 represents how much the analysis target (or analysis model 10) shrinks when temperature increment ΔT is varied. FIG. 12 shows as an example an amount of shrinkage in the Y direction at a coordinate X in the coordinate system shown in FIG. 1.

Referring to FIG. 12, temperature increment ΔT varied has a magnitude having a relationship of $\Delta T1 < \Delta T2 < \Delta T3 < \Delta T4$, and even for a minimum temperature increment ΔT1, a temperature increment of 100° C. or higher is given. When the temperature increment ΔT is increased, the amount of shrinkage increases and also varies, and computation accuracy deteriorates. However, temperature increment ΔT having a value larger than a temperature increment (15° C. or 30° C.) used in the thermal-elastic-plastic analysis computation using static implicit FEM can be provided, and a reduced computing time can be achieved.

Figure 13:
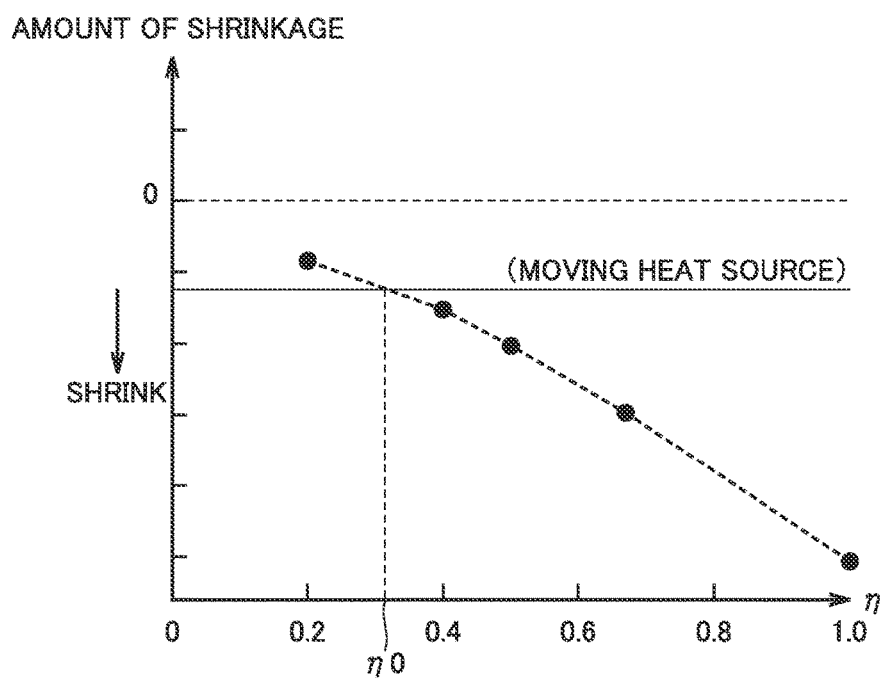
FIG. 13 represents an amount of shrinkage of an analysis target when an instantaneous heat source model is used.

FIG. 13 represents an amount of shrinkage of the analysis target (analysis model 10) when an instantaneous heat source model (a surface heat source) is used. In FIG. 13, the vertical axis represents an amount of shrinkage in the X direction (a median value), and the horizontal axis represents an equivalent heat input ratio q representing a ratio of a heat input quantity of a surface heat source to a heat input quantity of a moving heat source. That is, this graph represents an amount of shrinkage when the heat input quantity of the surface heat source is changed with reference to the heat input quantity of the moving heat source corresponding to an actual heat source.

Referring to FIG. 13, in this example, when the equivalent heat input ratio η is η0, an amount of shrinkage by the surface heat source is equivalent to that of shrinkage by the moving heat source. Accordingly, in the analysis method according to the present embodiment, when each block is heated by the surface heat source, as a correction coefficient indicated above in expression (2), η0 is applied so that an instantaneous heat source model (a surface heat source) is used which has a heat input quantity adjusted with respect to a heat input quantity applied when a moving heat source is used, which corresponds to an actual heating.

Thus, in the present embodiment, a thermal-elastic-plastic analysis using idealized explicit FEM is performed. And a temperature increment larger in magnitude than that used in a thermal-elastic-plastic analysis using static implicit FEM is provided (a large temperature increment). This can contribute to a reduced number of computations and hence a reduced computing time. Furthermore, according to the present embodiment, a heating pattern to simultaneously heat a plurality of blocks which are not adjacent to one another is used to heat each plurality of blocks, and a reduced computing time can be achieved (a simultaneous heating pattern). Furthermore, according to the present embodiment, each block is heated by a surface heat source after a heat input quantity is adjusted, which can also contribute to a reduced computing time (an instantaneous heat source model). The analysis method and apparatus according to the embodiment of the present disclosure can thus achieve a significantly reduced computing time.

[Modification]

In the above embodiment, in a thermal-elastic-plastic analysis using idealized explicit FEM, the above-described "large temperature increment" and "instantaneous heat source model" are adopted, and furthermore, the "simultaneous heating pattern" is also adopted to significantly reduce a computing time required for the analysis. The present modification contemplates further improvement of a computation methodology per se of idealized explicit FEM. This can further reduce the computing time required for the analysis.

Idealized explicit FEM is a methodology that improves computation efficiency for thermal-elastic-plastic analysis, based on dynamic explicit FEM, and has analysis accuracy equivalent to that of static implicit FEM generally used in thermal-elastic-plastic analysis and is capable of analysis at high speed with reduced memory. Idealized explicit FEM, however, requires, in its computation process, computing an overall static unbalanced force vector, that is, a residual force vector, for each time step. This computation requires an integral computation of all elements of an expression (2) indicated below, and thus accounts for a major portion of the computing time in idealized explicit FEM.

$$\{R\} = \{F\} - \sum_{e=1}^{Ne} \int_{V_e} [B_e]^T \{\sigma_e\} dV \tag{2}$$

where $\{R\}$ represents an overall residual force vector, $\{F\}$ represents a load vector, $[B_e]$ represents a displacement-strain relationship matrix of an element e, and $\{\sigma_e\}$ represents a stress vector of the element e. Ne represents the number of elements of the analysis model. The integral computation of the expression (2) is expressed in a linear elastic analysis by the following expression (3):

$$\{R\} = \{F\} - \sum_{e=1}^{Ne} [K_e]\{u_e\} \tag{3}$$

where $[K_e]$ represents a stiffness matrix of the element e, and $\{u_e\}$ represents a displacement vector of the element e. The expression (3) represents the integral computation of the expression (2) by the product of a matrix and a vector, and the amount of computation when computing the residual force vector by the expression (3) is overwhelmingly smaller than that of computation by expression (2). Thus it is believed that using the expression (3) in idealized explicit FEM for computing the residual force can significantly reduce an amount of computation and achieve high speed.

However, the expression (3) is a computational expression assuming a linear elastic body, and it cannot exactly be applied to nonlinear thermal-elastic-plastic analysis. Accordingly, in the present modification, a method indicated in a flowchart described hereinafter is used to allow the expression (3) to be also adopted for nonlinear thermal-elastic-plastic analysis using idealized explicit FEM.

Schematically, initially, displacement is computed by performing computation for N time steps based on dynamic explicit FEM, similarly as done based on typical ideal explicit FEM. In doing so, a residual force at each time step is computed using the expression (3) to reduce a computing time. After computations for N time steps have been completed, the expression (2) is used to compute a nonlinear residual force vector, which is set as a load (or external force). Thereafter, computations for N time steps are performed, with the residual force vector as a load vector, and displacement is again computed. By repeating such a computational process until an overall convergence is obtained, an analysis result equivalent to that when the expression (2) is used can be obtained while how many times a computation of a nonlinear residual force (expression (2)) is performed is significantly reduced.

Figure 14:
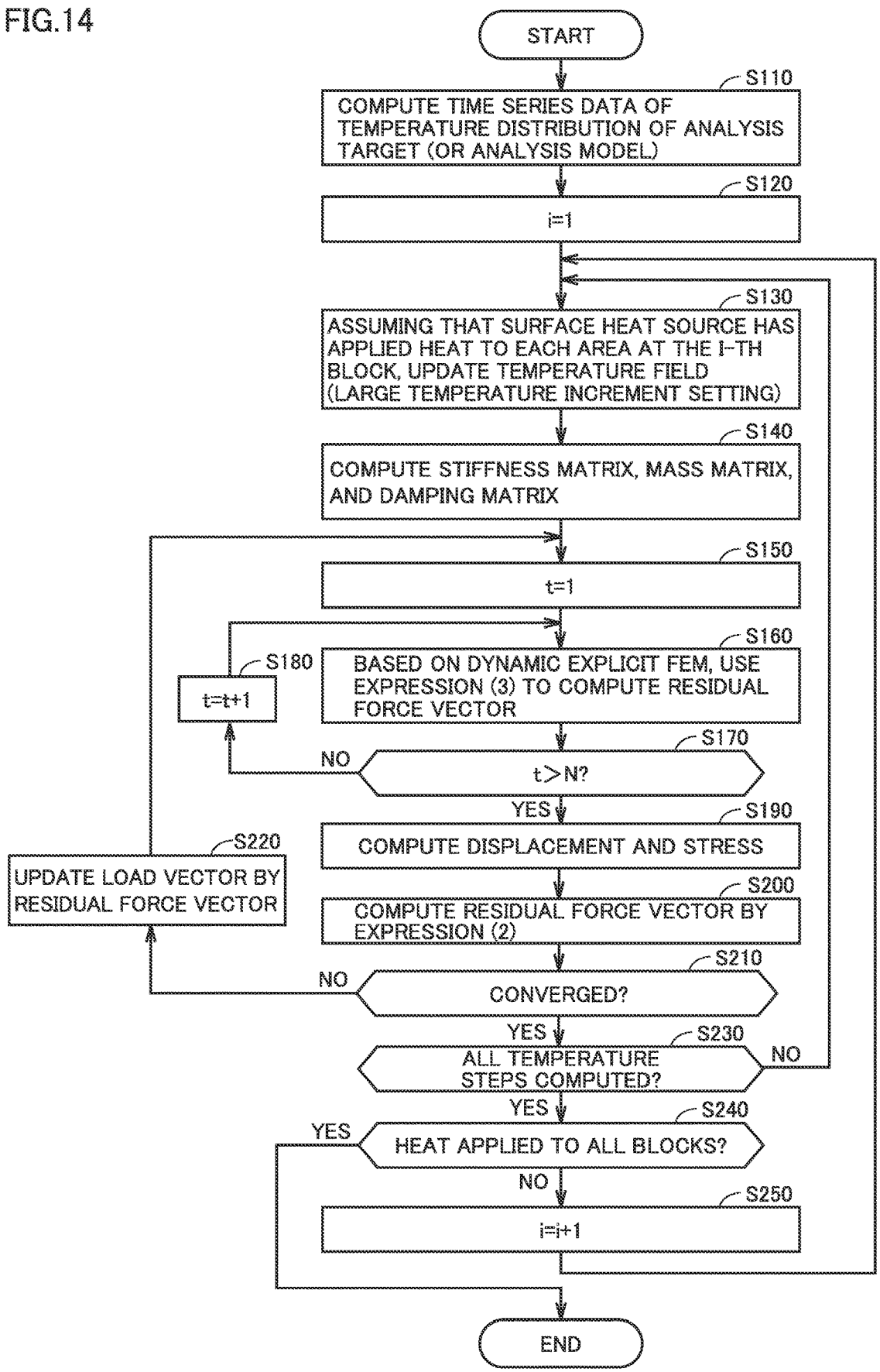
FIG. 14 is a flowchart for illustrating a procedure of a process of an FEM thermal-elastic-plastic analysis performed by an analysis apparatus in a modification.

FIG. 14 is a flowchart for illustrating a procedure of a process of an FEM thermal-elastic-plastic analysis performed by analysis apparatus 100 in the present modification. This flowchart corresponds to FIG. 11 described in the above embodiment.

Referring to FIG. 14, analysis apparatus 100 performs steps S110 to S130. Steps S110 to S130 are the same as steps S10 to S30, respectively, shown in FIG. 11, and accordingly, will not be described repeatedly.

In step S130 when a temperature field is updated, analysis apparatus 100 computes a stiffness matrix $[K_e]$, a mass matrix $[M]$, and a damping matrix $[C]$ using a variety of types of data read from input unit 110 (see FIG. 9) (step S140). Further, analysis apparatus 100 sets a time step counter t to an initial value of 1 (step S150).

Then, analysis apparatus 100 gives a load caused by the temperature increment ΔT as a load vector $\{F\}$ for the expression (1), and uses the expression (3) to compute a residual force vector $\{R\}$, based on dynamic explicit FEM (step S160). Then, analysis apparatus 100 determines whether the counter t has exceeded N, where N represents a prescribed natural number (step S170). When the counter t is equal to or smaller than N (NO in step S170), the counter t is incremented (step S180), and the process is returned to step S160.

When it is determined in step S170 that the counter t has exceeded N (YES in step S170), analysis apparatus 100 computes displacement and stress for each node (step S190). Furthermore, analysis apparatus 100 computes a non-linear residual force vector {R} by the above expression (2) (step S200).

Subsequently, analysis apparatus 100 determines whether a solution has converged (step S210). For example, when it is determined that a computed displacement has reached the static equilibrium state, it is determined that a solution has converged. When the solution has not converged (NO in step S210), analysis apparatus 100 updates the load vector {F} by the residual force vector {R} computed in step S200 (step S220), and returns the process to step S150.

When it is determined in step S210 that the solution has converged (YES in step S210), analysis apparatus 100 proceeds to step S230. Steps S230 to S250 are identical to the FIG. 11 steps S80 to S100, respectively, and will not be described repeatedly.

According to this modification, an integral computation of a residual force that accounts for a major portion of the computing time of idealized explicit FEM can be performed less frequently, and a computing time required for analysis can further be reduced.

Second Embodiment

In a second embodiment, a method for additively manufacturing an object will be described based on a result of an analysis using the analysis method according to the above-described embodiment.

The present inventors employed the above analysis method to analyze residual stress and deformation caused in an additively manufactured object under various manufacturing conditions. As a result, the present inventors have found that heating a surface layer of the additively manufactured object such that a most peripherally located block is heated and a block inner than the most peripherally located block (e.g., a block inner by one or two rows than the most peripherally located block) is subsequently heated can reduce residual stress in a most peripheral portion most susceptible to defects (such as cracking, deformation, etc.) attributed to residual stress. It is believed that such a heating pattern can reduce residual stress in a most peripheral portion because as the block inner than the most peripherally located block melts and solidifies, it shrinks, which alleviates residual stress in a tensile direction that is caused in the most peripherally located block.

Figure 15:
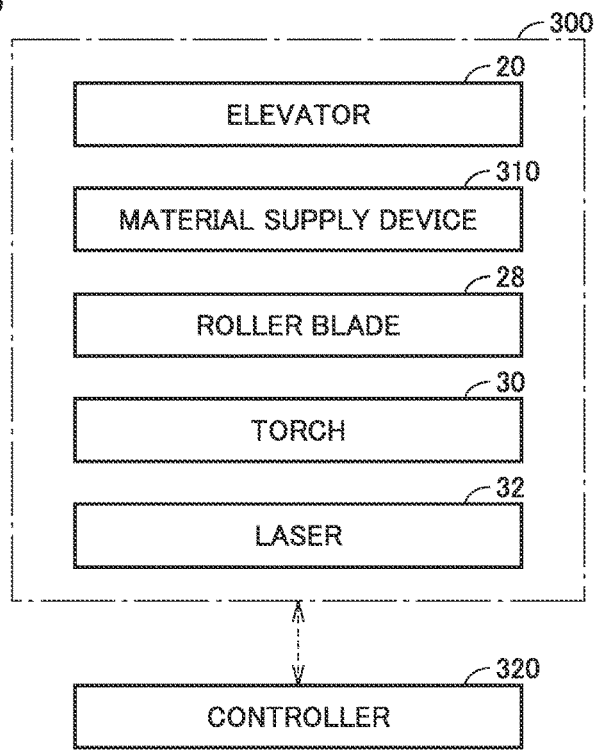
FIG. 15 schematically shows a structure of a metal 3D printer shown as an example of an apparatus used to additively manufacture an object.

FIG. 15 schematically shows a structure of a metal 3D printer shown as an example of an apparatus used to additively manufacture an object. Referring to FIG. 15, the metal 3D printer includes a work unit 300 and a controller 320. Work unit 300 includes an elevator 20, a material supply device 310, a roller blade 28, a torch 30, and a laser 32. Elevator 20, roller blade 28, torch 30, and laser 32 are as has been described with reference to FIGS. 3 and 4. Material supply device 310 supplies metal powder 26 onto intermediate additively manufactured part 24.

Controller 320 includes a CPU, a RAM, a ROM, and an input/output buffer for inputting/outputting various signals (all not shown). The CPU expands in the RAM or the like a program stored in the ROM and thus runs the program. The program stored in the ROM is a program which describes a procedure of a process performed by controller 320. Controller 320 controls each device in work unit 300 according to these programs. This control is not limited to processing by software, and may be done by processing by dedicated hardware (or electronic circuitry).

As a major process performed by controller 320, controller 320 divides the topmost layer of intermediate additively manufactured part 24 into a plurality of blocks and controls a heat source (torch 30 and laser 32) to move to melt and solidify metal powder 26 for each block. In each block, as shown in FIG. 7, controller 320 heats a surface of each block while moving the heat source (torch 30 and laser 32).

And for an order of heating a plurality of blocks, controller 320 controls the heat source (torch 30 and laser 32) such that, of the plurality of blocks, most peripherally located blocks (hereinafter also referred to as a "first block group") are heated and thereafter blocks inner than the first block group (hereinafter also referred to as a "second block group") are heated. The second block group may be inner than the first block group by one row, or may be inner than the first block group by two or more rows insofar as the plurality of blocks are sufficiently subdivided.

Figure 16:
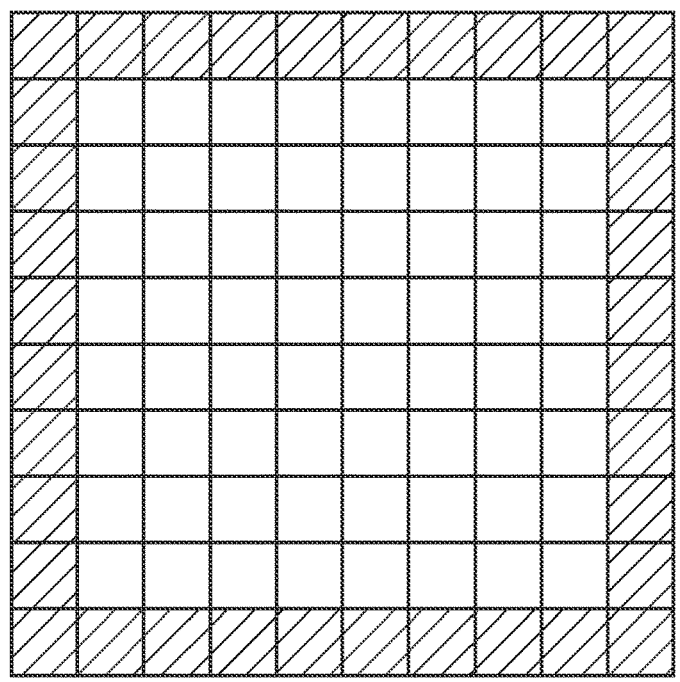
FIG. 16 is a first diagram for illustrating an example of an order of heating a plurality of blocks.
Figure 17:
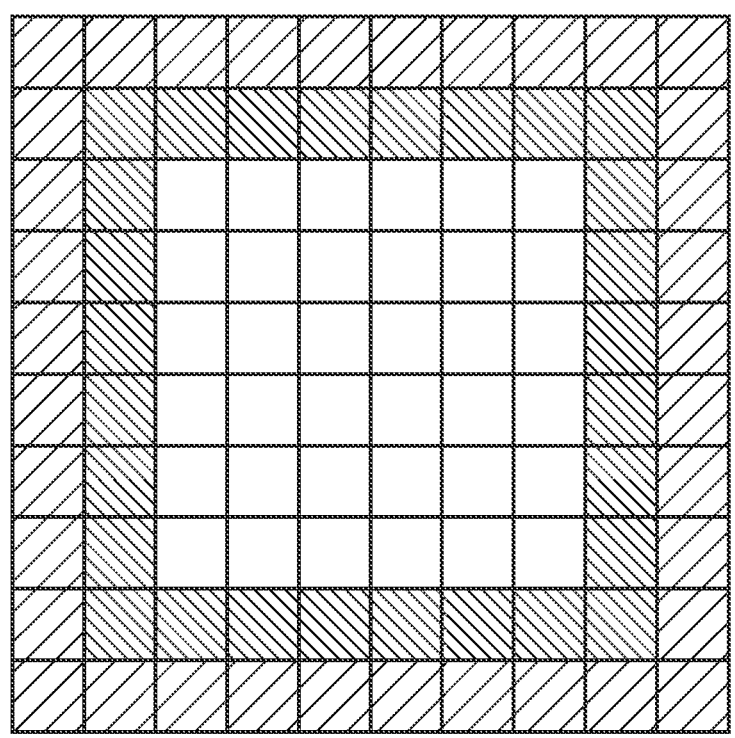
FIG. 17 is a second diagram for illustrating the example of the order of heating the plurality of blocks.

FIGS. 16 and 17 are diagrams for illustrating an example of an order of heating a plurality of blocks (a heating pattern). With reference to FIGS. 16 and 17, in this example, intermediate additively manufactured part 24 has a topmost layer divided into 10×10 blocks. After the first block group located at the most peripheral portion has been heated (see FIG. 16), the second block group is heated (see FIG. 17). Note that these figures do not show whether each block inner than the second block group is heated or not.

The first and second block groups may be heated in an order such that each block other than the second block group is heated randomly or in a prescribed order, and after the first block group has its blocks all heated, each remaining block including the second block group is heated randomly or in a prescribed order. Alternatively, the first block group may be collectively, sequentially heated and subsequently the second block group may be collectively, sequentially heated.

Figure 18:
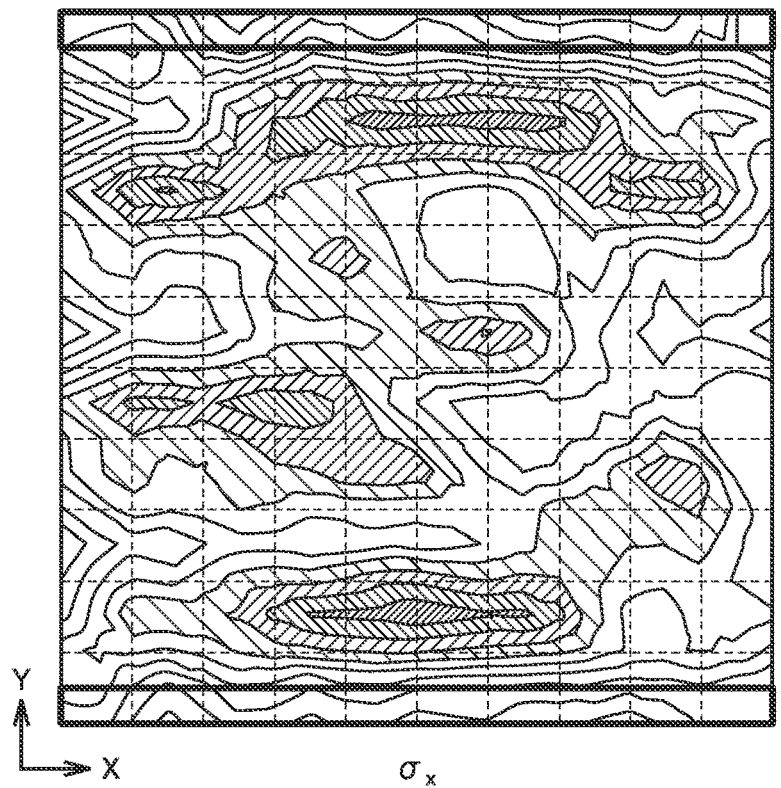
FIG. 18 is a first diagram showing an example of a result of an analysis of residual stress caused in an additively manufactured object.
Figure 19:
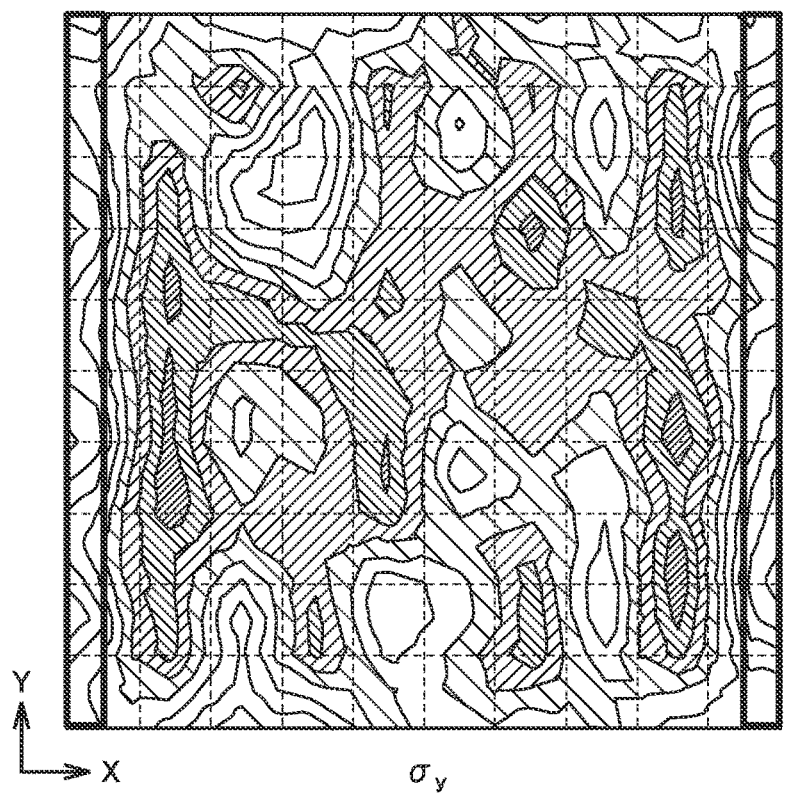
FIG. 19 is a second diagram showing an example of a result of an analysis of residual stress caused in an additively manufactured object.

FIGS. 18 and 19 are diagrams representing an example of a result of an analysis of residual stress remaining in an additively manufactured object. FIG. 18 represents a distribution of residual stress $\sigma x$ in the X direction (tensile direction) remaining after all blocks have been heated, and FIG. 19 represents a distribution of residual stress $\sigma y$ in the Y direction (tensile direction).

Referring to FIG. 18, it can be seen that heating in the heating order (or heating pattern) shown in FIGS. 16 and 17 can relatively reduce residual stress $\sigma x$ in the X direction (tensile direction) in a most peripheral portion surrounded by a frame line.

Further, referring to FIG. 19, it can be seen that heating in the heating order (or heating pattern) shown in FIGS. 16 and 17 can relatively reduce residual stress $\sigma y$ in the Y direction (tensile direction) in a most peripheral portion surrounded by a frame line.

FIG. 20 is a flowchart of an example procedure of a process performed by controller 320. This flowchart indicates a series of steps which determines an order of heating the first and second block groups, and corresponds to step IV shown in FIG. 3.

Referring to FIG. 20, controller 320 controls a heat source (torch 30 and laser 32) to move to heat any of blocks other than blocks inner by one row than a most peripheral portion (i.e., the second block group) and unheated (step S310). When the block of interest has been heated, controller 320 determines whether the most peripherally located blocks (or the first block group) have all been heated (step S320).

When the first block group has any block unheated (NO in step S320), controller 320 returns to step S310. Note that an order of heating blocks by repeatedly performing step S310 may be random or regular.

When it is determined in step S320 that the first block group has had its blocks all heated (YES in step S320), controller 320 controls the heat source (torch 30 and laser 32) to move to heat any of remaining blocks unheated (including the second block group) (step S330). When the block of interest has been heated, controller 320 determines whether all blocks have been heated (step S340).

When there is any block remaining unheated (NO in step S340), controller 320 returns to step S330. Note that an order of heating blocks by repeatedly performing step S330 may also be random or regular. When it is determined in step S340 that all blocks have been heated (YES in step S340), controller 320 proceeds to the end of the process.

Thus, according to the second embodiment, it is possible to suppress residual stress caused in a most peripheral portion of an additively manufactured object.

While each of the above embodiments has been described for additive manufacturing using a metal 3D printer, the present disclosure is not limited thereto in scope and is also applicable to additive manufacturing using resin powder, additive manufacturing by depositing molten resin or metal molten through arc discharge.

The presently disclosed embodiments should be considered as illustrative and not restrictive in any respect. The scope of the present invention is defined by the terms of the claims, rather than the embodiments described above, and is intended to include any modifications within the meaning and scope equivalent to the terms of the claims.

The invention claimed is:

1. A method for additively manufacturing an object by depositing a molten material while solidifying the material, comprising:
   inputting data for performing a thermal-elastic-plastic analysis of the additively manufactured object by employing a finite element method (FEM); and
   computing residual stress and deformation caused in the additively manufactured object, by performing the thermal-elastic-plastic analysis in accordance with a set temperature increment and a heat source model indicating a model of heating the additively manufactured object, using time series data of a temperature distribution caused in the additively manufactured object as the object is additively manufactured, wherein
   in the computing residual stress and deformation, when a temperature increment following the time series data is given, dynamic explicit FEM is employed to compute the additively manufactured object's displacement and stress until a prescribed static equilibrium condition is reached, and once the displacement has reached the static equilibrium condition, the set temperature increment is given again and the displacement and stress are computed again,
   the set temperature increment is set in magnitude to have a value larger in magnitude than a temperature increment used in the thermal-elastic-plastic analysis of the additively manufactured object using static implicit FEM, and
   the heat source model is an instantaneous heat source model having a heat input quantity adjusted with respect to a heat input quantity applied when a moving heat source is used to heat the additively manufactured object, so that the additively manufactured objects shrinks in an amount equivalent to that when the moving heat source is used to heat the additively manufactured object, the method further comprising:
      determining a heating pattern to be applied in heating a topmost layer of the additively manufactured object, based on a result of the computing residual stress and deformation; and
      heating the additively manufactured object using the moving heat source in accordance with the heating pattern.

2. The method for additively manufacturing an object according to claim 1, wherein a topmost layer of the additively manufactured object is divided into a plurality of blocks, and the model of heating is a model in which the topmost layer is heated for each block.

3. The method for additively manufacturing an object according to claim 2, wherein the model of heating is a model in which the topmost layer is heated in accordance with a heating pattern in which at least two blocks that are not adjacent to each other are simultaneously heated.

4. The method for additively manufacturing an object according to claim 1, wherein the material is metal, and the temperature increment has a magnitude of at least 100° C. or higher.

5. The method for additively manufacturing an object according to claim 1, wherein the temperature increment is determined in magnitude based on a mechanical melting temperature of a metal constituting the additively manufactured object.

* * * * *